Nov. 8, 1960     W. R. DOW, SR     2,958,916
CABLE STOPPER

Filed Nov. 17, 1954     4 Sheets-Sheet 1

INVENTOR
WARREN R. DOW, SR
BY George Sipkin
Lee J. Huntzberger
ATTORNEYS

Nov. 8, 1960 W. R. DOW, SR 2,958,916
CABLE STOPPER

Filed Nov. 17, 1954 4 Sheets-Sheet 2

INVENTOR
WARREN R. DOW, SR.
BY George Sipkin
Lee J. Huntzberger
ATTORNEYS.

Nov. 8, 1960  W. R. DOW, SR  2,958,916
CABLE STOPPER
Filed Nov. 17, 1954  4 Sheets-Sheet 3
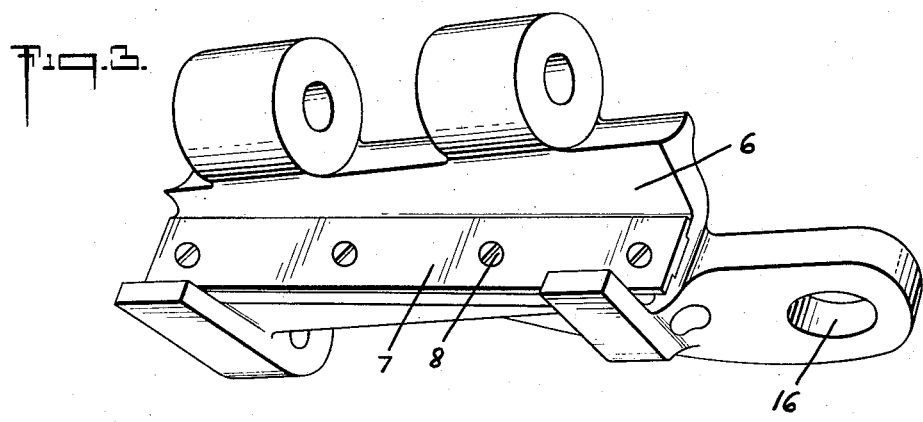
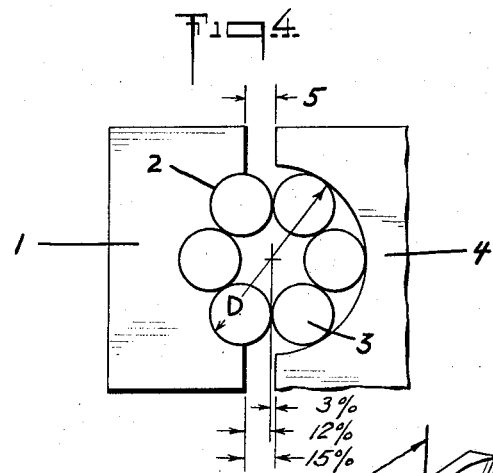
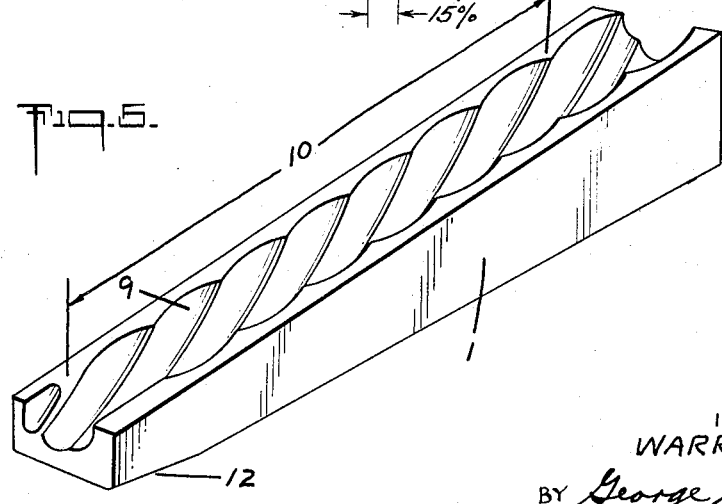
INVENTOR
WARREN R. DOW, SR.
BY George Sipkin
Lee J. Huntzberger
ATTORNEYS

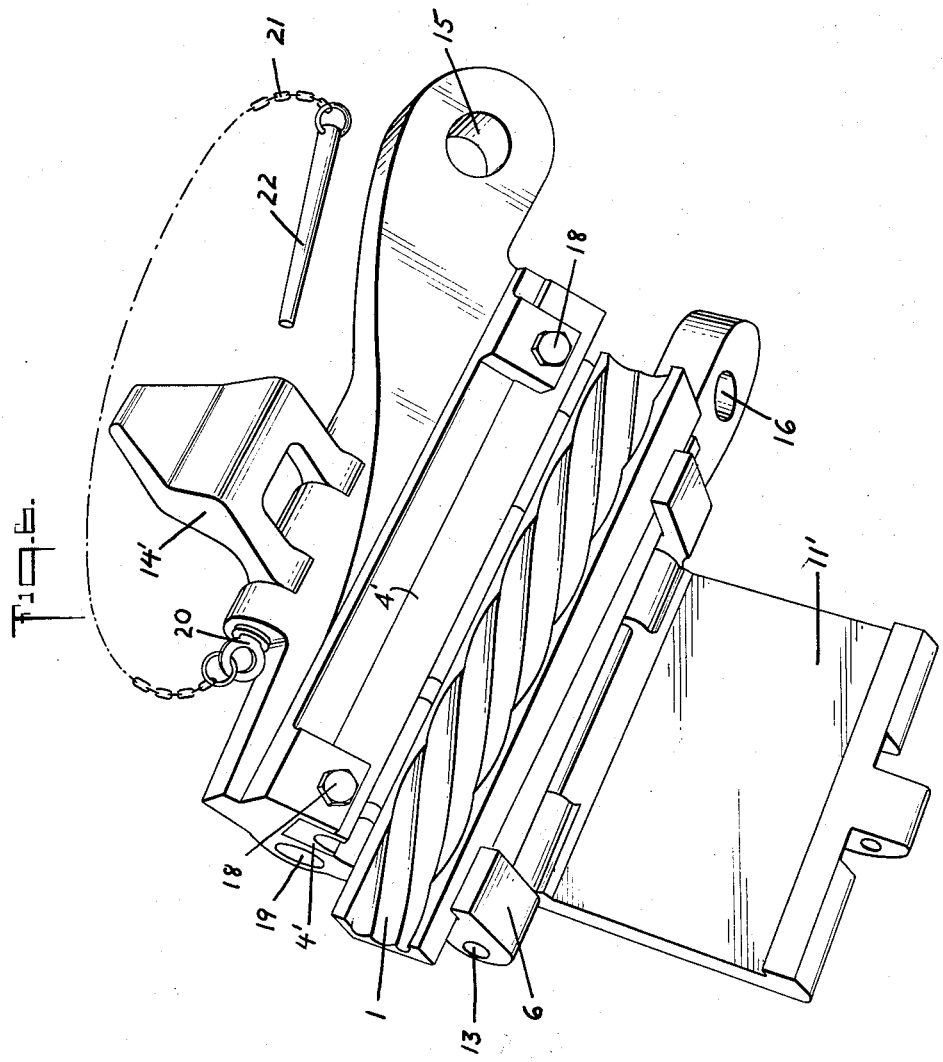

United States Patent Office 2,958,916
Patented Nov. 8, 1960

2,958,916

CABLE STOPPER

Warren R. Dow, Sr., Hampton, N.H., assignor to the United States of America as represented by the Secretary of the Navy Filed Nov. 17, 1954, Ser. No. 469,571

4 Claims. (Cl. 24—126)

(Granted under Title 35, U.S. Code (1952), sec. 266)

The invention described herein may be manufactured and used by or for the Government of the United States of America for governmental purposes without the payment of any royalties thereon or therefor.

This invention relates to stoppers for wire ropes or cables by which a body may be securely fixed to the rope or cable. More particularly it is an improvement upon cable holding stoppers of the type disclosed in U.S. Patent #639,520 of December 19, 1899 to J. Carpenter.

An object of the invention is to provide a cable stopper which may be used to grip and hold a cable with maximum effectiveness and with a minimum of deformation or damage to the rope or cable, which will have maximum life before it needs repairs, which is not open to the objections that have been raised against prior art stoppers, and which will be relatively simple, practical, convenient, durable and inexpensive in construction and easily manipulated in use.

Other objects and advantages will be apparent from the following description of some examples of the invention, and the novel features will be particularly pointed out hereinafter in connection with the appended claims.

Figure 1:
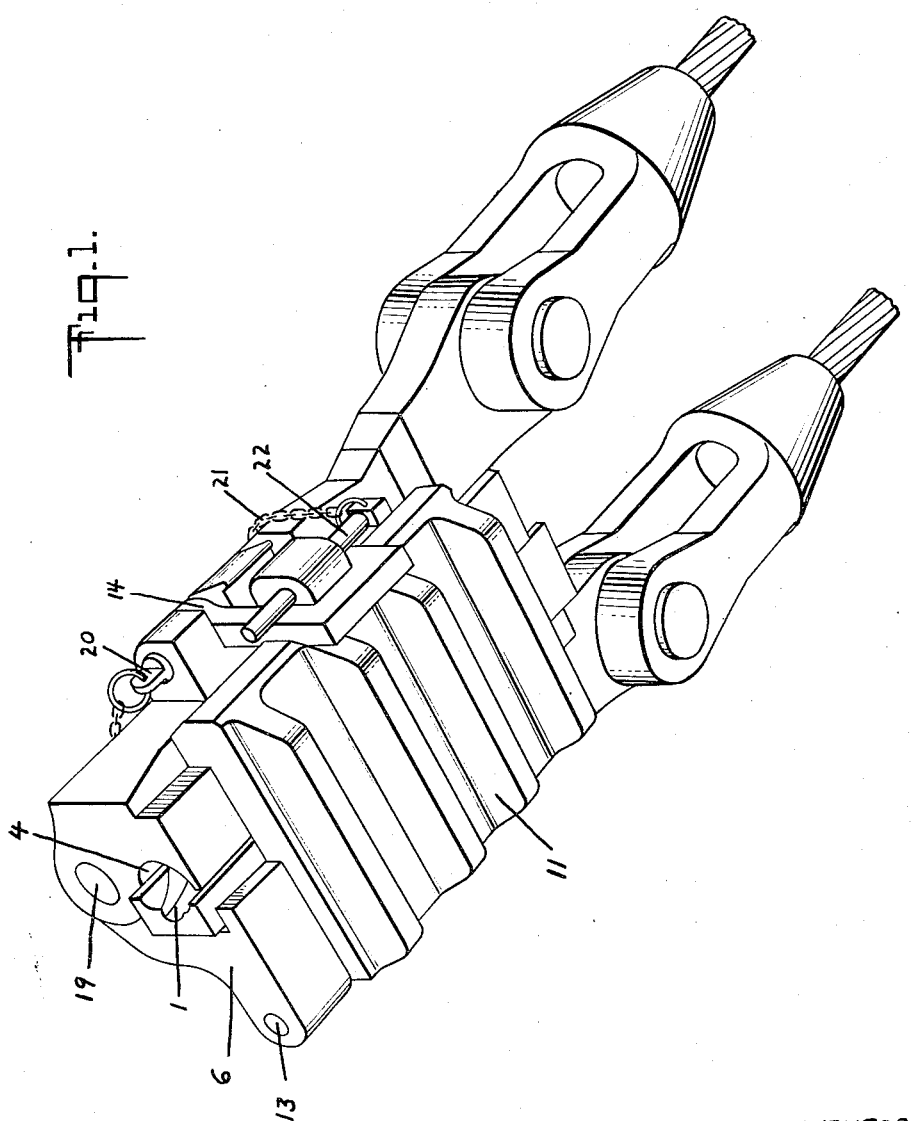
Figure 2:
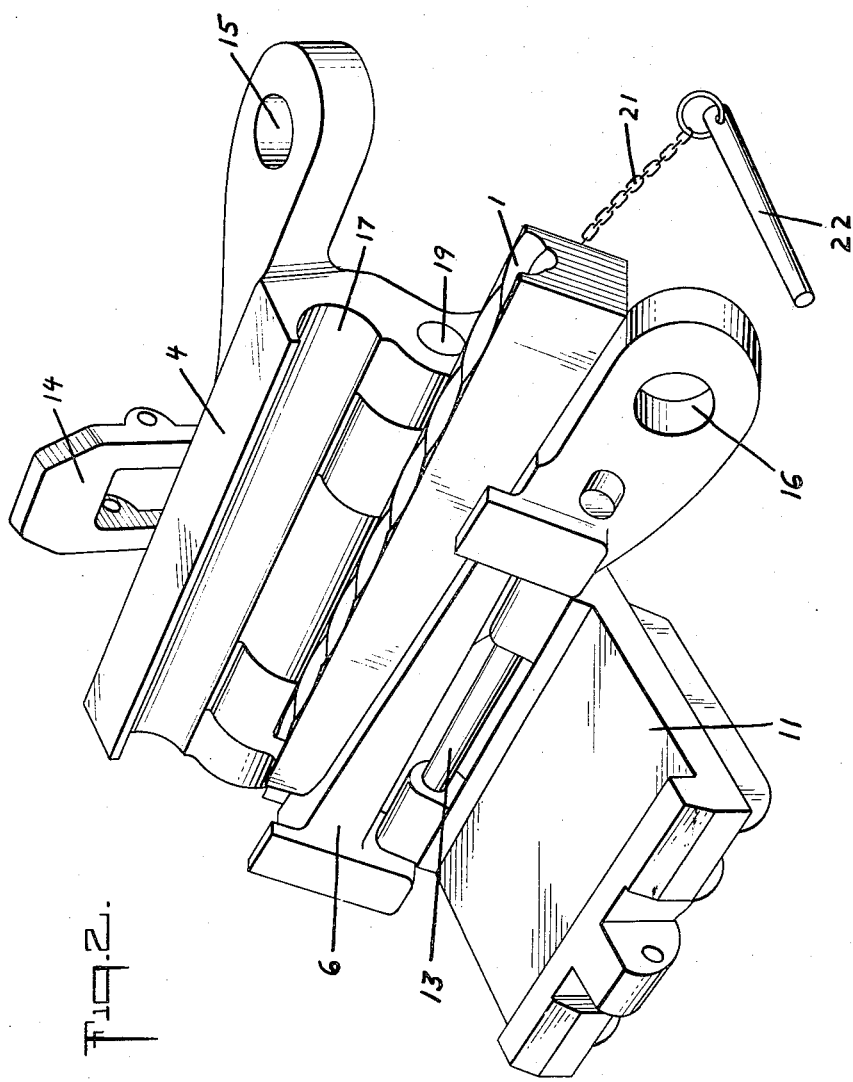

In the accompanying drawings:

Fig. 1 is a full perspective view of my improved cable stopper in closed position, Fig. 2 is a full perspective view of my improved cable stopper in open position, Fig. 3 is a perspective view of the stopper body of my improved cable stopper, Fig. 4 is a transverse cross-sectional view of the gripping elements of my improved cable stopper, Fig. 5 is a perspective view of the gripping wedge of my improved stopper, and Fig. 6 is a full perspective view of a modification of the invention illustrating the adapter version of my improved cable stopper, in opened position.

Referring first to Figs. 1 to 5, the cable stopper illustrated is formed of two body sections 4 and 6 which are hinged together by hinge pin 19 so as to swing between a closed position in which the sections are close together as shown in Fig. 1 and an open position as shown in Fig. 2. The inside face of one section, such as section 4, is provided with a concave cavity 17 which corresponds generally to a segment of a cylindrical wall, and which extends from end to end of the section and is open at both ends. The other section of the body has a channel therein from end to end and open at both ends, with a bearing wall at the bottom of the channel which is inclined in an endwise direction from one end to the other. A wear plate 7 is detachably secured against this inclined bearing wall by screws 8, and this plate may have a rib extending lengthwise of itself and fitting a channel in the inclined bearing wall, as shown in Fig. 3.

A wedge member 1 which is tapered from one end to the other rests upon the bearing plate 7 and is within the channel, so as to slide endwise on plate 7. The face of this wedge member 1, which is opposite from that which abuts the bearing plate 7, is provided with a recess that runs from end to end thereof and corresponds generally to a segment of a cylindrical surface, with its axis approximately parallel to the axis of the cavity 17. The recess is aligned with the cavity, face to face, when the sections are closed and the wall defining the recess has therein helical grooves that progress endwise thereof with a pitch slightly greater than the normal pitch of the helical ribs on the periphery of a rope or cable that is to be clamped in the cavity and the recess, and to conform to the pitch of the ribs of a rope or cable at its greatest amount of stretch. The grooves correspond generally in size with the helical ribs on the surface of a wire rope or cable to be clamped. The grooves in the concave wall of the recess have a helix lead greater than that of the rope or cable to be clamped by at least 1½% at no load.

The gap 5, shown in Fig. 4 between the face of the wedge member 1 along the sides of the recess and the face of the body section 4 along the sides of the cavity therein, when the wedge is somewhat at the lower end of the inclined wall, and projecting somewhat beyond the body sections, is about 10% to 15% of the normal cable diameter when the cable is at zero tension. It may be obtained, for example, by removing material from the body section 4 along the sides of the cavity 17 by an amount equivalent to about 3% (Fig. 4) of the rope or cable diameter, and from the face of the wedge member, along the recess therein, an amount equivalent to about 12% of the cable or rope diameter. The wedging action on the cable, as the wedging member moves endwise in contact with the cable, tends to close this gap as the higher tensile loads are approached. This effectively prevents extrusion of the cable wires or strands through the gap, and confines the cable in an encircling chamber where distortion of and damage to the cable is prevented. The sizes of the cavity and recess are selected for each size of cable to be clamped, and vary with changes in the diameter of the cable. The ribs on the cable surface fit the helical grooves in the wall of the recess when the load on the cable is a maximum, such as near or at the breaking point of the cable. The length of the cable gripping portion of the stopper is in a ratio varying from 6 to 1 to 8 to 1, compared to the cable diameter. The cavity ends and helix groove edges are well-rounded to prevent injury to the cable. No shoulder is present to limit travel of the cable and wedge member, since the gap opening determines this travel.

A cover 11 is hinged to the body section 6 by the cover hinge pin 13, and projects over the wedge member and the body section 4 when the sections are closed, as shown in Fig. 1. A U-shaped lock 14 is hinged to the body section 4 and can swing across the free side edge of the cover 11 when the latter is closed. An apertured boss on the free side edge of the cover (Fig. 2) is received between the arms of the U of the lock 14, as shown in Fig. 1, and a pin 22 secured by a chain 21 to a stud 20 on body section 4, may be passed through the aperture in the boss on the cover and in front of the U-shaped lock 14 to hold the cover releasably in closed position, as shown in Fig. 1. The body sections 4 and 6, at the ends adjacent the lower end of the inclined wall of section 6 upon which the wedge member slides, are provided with lugs having apertures 15 and 16 by which the stopper may be anchored or held against the cable pull, as shown in Fig. 1.

In Fig. 6 a larger size adaptor type stopper is illustrated for use with several sizes of cable. There are some ships whose activities involve the use of several sizes of cable for which stoppers are required. It would usually be impractical to provide standard stoppers for each different size of cable, and in such cases this adaptor type stopper is useful.

A special lock design that gives safety and convenience is also provided. This type of special lock 14' for cover 11' requires a heavy downward blow to strike it from the cover locking lug. The striking surface at the top of the lock (Fig. 6) is intended to deflect the hammer outside of the path of the suddenly released cover, should the striking blow be inaccurate. With this adaptor type stopper the partially cylindrical wall of the cavity is provided in an adaptor insert for the body section 4, and is held in place by cap screws 18. Wedge members with different sizes of recesses are also selectively used. There are some ships, however, whose activities involve the use of several sizes of wire rope for which stoppers are required. To issue standard stoppers for each size would add considerable weight and would require additional storage space. For these ships the "adapter" type stopper of Fig. 6 has been developed.

The essential feature of the adapter type stopper is that with the use of an appropriate adapter block or insert 4' and mating gripping wedge 1, one stopper body can be used for any size wire rope smaller than that for which it was designed, providing the proper insert or adapter block and gripping wedge is used. The adapter insert or block 4' can be readily removed and replaced by one of another size at a moment's notice. This stopper retains the same strength, protective features, and operating functions of the standard type.

The smooth wedge body 1, of Fig. 1, which was forged in the same die as the improved stoppers, is altered to accommodate the adapter block. The insert or adapter block 4' is held in place by cap screws 18, shown in Fig. 6. The screws retain the blocks without taking any part of the operating load.

For larger sizes of stopper a special lock design has been evolved for safety and convenience. This type of lock (14', in Fig. 6) requires a heavy downward blow to strike it from the cover locking lug. The striking surface at the top of the lock is designed to deflect the hammer outside the path of the suddenly released cover, should the blow be inaccurate.

After fitting with the proper gripping wedge and adapter block, operation and use of the adapter type stopper is the same as that of the standard type, described heretofore. When a different size of cable is to be gripped, the insert and the wedge member are changed.

In the use of the improved stopper shown in Figs. 1–5, the cavity in body section 4 is smooth so that the cable may readily slide along it while it is gripped between that cavity and the wall of the recess in the wedge member and pulled endwise by the latter. It has been found that with this type of grip on the cable, the pressure on the cable will not sever, crush or damage seriously any of the strands of the cable. With the stopper fully opened and the wedge member extending endwise about two-thirds of the way out of body section 6, the wire rope or cable is laid in the cavity or recess and the two body sections 4 and 6 brought together and locked in that condition by the lock 14' and pin 22. The pin 22 is slightly tapered and is tightened by one or more light blows on the larger end thereof by a hammer. The wedge member should be set up tight against the cable to insure that the member will be drawn into the stopper by a pull on the cable. As such pull or load is applied to the cable, the latter will slide until its contour matches that of the helical grooves in the recess of wedge member 1, when both will be drawn into the stopper and the cable become securely gripped.

After releasing the load, the tapered pin 22 is driven out. In smaller sizes, the lock may be struck off with a sharp blow of a hammer swinging across the top of the stopper. On the large sizes a heavy downward blow may suffice. In Fig. 2 the entrance end of the recess at 17 is tapered to permit of an easy "flow" of the cable into the stopper without damage to the cable or the wire strands of which the cable or rope is made. The wall of the cavity in section 4 is preferably of steel of nearly the hardness of the wire cable to resist scarring and abrasion of the cavity, but for the wall of the recess in the wedge member, steel somewhat softer than the wire cable is used to reduce abrasion of the cable. The bearing strip 7 is preferably made of non-ferrous material such as of hard Phosphor bronze, and it assures a complete wedging action by member 1, which heretofore was prevented by virtue of the adherent action due to sliding of steel on steel under heavy loads. The Phosphor bronze bearing strip 7 prevents wire cable slippage and indirectly eliminates shearing of the gripping edges of the helical grooves in the wedge member, galling and seizure of the gripping edges, and breakage of the wires on the helical groove edges.

The wedge member, on its smaller end, is tapered as at 12, to prevent "digging in" of the leading or entering end of the member, as it slides into the stopper body.

Obviously many modifications and variations of the present invention are possible in the light of the above teachings. It is therefore to be understood that within the scope of the appended claims the invention may be practiced otherwise than as specifically described.

I claim:

1. In a cable clamping device of the type having a body with a passage from end to end therethrough and jaws within the passage for clamping and holding a cable passing through the passage, with a part of the wall of the passage having the shape of a cylindrical segment forming one jaw to engage with and clamp the cable, and a wedge member slidable on said body in directions endwise of and within said passage but disposed opposite from said jaw and having a concave surface of the shape of a cylindrical segment facing said one jaw and forming the second and opposing jaw to engage the cable, that improvement therein which comprises helical grooves in said concave surface of said member progressing lengthwise along the same, and said member having the pitch of said grooves slightly greater than the normal pitch of the helical ribs on the periphery of a cable to be clamped, and corresponding to the pitch of the ribs of said cable at approximately its greatest amount of stretch.

2. In a cable clamping device of the type having a body with a passage from end to end therethrough and jaws within the passage for clamping and holding a cable passing through the passage with a part of the wall of the passage having the shape of a cylindrical segment forming one jaw to engage with and clamp the cable, and a wedge member slidable on said body in directions endwise of and within said passage but disposed opposite from said jaw and having a concave surface of the shape of a cylindrical segment facing said one jaw and forming the second and opposing jaw to engage the cable, that improvement therein which comprises helical grooves in said concave surface of said member progressing lengthwise along the same, and said member having the pitch of said grooves slightly greater than the normal pitch of the helical ribs on the periphery of a cable to be clamped, and corresponding to the pitch of the ribs of said cable at approximately its greatest amount of stretch, said body having an anti-friction plate of softer material than said member, against which said member slides.

3. The device as set forth in claim 1 wherein said grooves have a helix lead greater than the helix pitch of said cable by at least about 1½%.

4. The device as set forth in claim 1 wherein said wedge member has a length more than about seven times the diameter of the cable to be held.

(References on following page)

References Cited in the file of this patent

UNITED STATES PATENTS

| | | |
|---|---|---|
| Re. 20,074 | Stahl | Aug. 18, 1936 |
| 452,185 | Jones | May 12, 1891 |
| 639,520 | Carpenter | Dec. 19, 1899 |
| 1,114,235 | De Carteret | Oct. 20, 1914 |
| 1,159,096 | Rigby | Nov. 2, 1915 |
| 1,622,110 | Haworth | Mar. 22, 1927 |
| 1,644,375 | Haworth | Oct. 4, 1927 |
| 2,060,864 | Hedler | Nov. 17, 1936 |
| 2,146,575 | Hefftner | Feb. 7, 1939 |
| 2,180,866 | Cryer | Nov. 21, 1939 |

FOREIGN PATENTS

| | | |
|---|---|---|
| 23,950 | Great Britain | Oct. 19, 1912 |
| 475,664 | France | June 7, 1915 |